United States Patent [19]

Moczygemba et al.

[11] 3,983,187

[45] Sept. 28, 1976

[54] IODINE MOLECULAR WEIGHT REGULATORS IN SUSPENSION POLYMERIZATION SYSTEMS

[75] Inventors: George A. Moczygemba; W. Delmar Johnson; Earl Clark, all of Bartlesville, Okla.

[73] Assignee: Phillips Petroleum Company, Bartlesville, Okla.

[22] Filed: Sept. 27, 1974

[21] Appl. No.: 510,040

Related U.S. Application Data

[63] Continuation of Ser. No. 303,330, Nov. 3, 1972, abandoned.

[52] U.S. Cl. .............................. 260/880 R; 260/879; 260/881; 260/885; 260/886
[51] Int. Cl.² ...................... C08L 9/00; C08L 9/02; C08L 9/06
[58] Field of Search .................. 260/879, 880 R

[56] References Cited

UNITED STATES PATENTS

| 1,898,522 | 3/1933 | Bock et al. ......................... 260/94.2 |
| 2,647,107 | 7/1953 | Barnes ............................... 260/78.5 |
| 3,219,712 | 11/1965 | Hauptschein et al. ............ 260/653.1 |
| 3,238,342 | 3/1966 | Chaikin ............................... 200/166 |
| 3,719,731 | 3/1973 | Shuster et al. ...................... 260/879 |

OTHER PUBLICATIONS

Gregg et al., J. Am. Chem. Soc. 75, (1953), pp. 3530–3533.
Walling et al., Free Radicals in Solution, Publ. by John Wiley & Sons, Inc., N.Y. (1957), pp. 152–153.

*Primary Examiner*—Harry Wong, Jr.

[57] ABSTRACT

Iodine or organic iodides are effective in suspension polymerization systems as molecular weight regulators or modifiers. These modifiers are especially suited for the suspension ABS processes.

13 Claims, No Drawings

IODINE MOLECULAR WEIGHT REGULATORS IN SUSPENSION POLYMERIZATION SYSTEMS

This application is a continuation of Ser. No. 303,330 filed Nov. 3, 1972, now abandoned.

FIELD OF THE INVENTION

The invention relates to modifiers effective as molecular weight regulators in suspension polymerization systems. In another aspect, the invention relates to a process of suspension polymerization.

BACKGROUND OF THE INVENTION

Mercaptans commonly are employed in suspension polymerization systems to act as molecular weight regulators or modifiers. While effective, these have, at times, exhibited some objectionable characteristics such as residual mercaptan odor in the polymeric product. Possible volatilization of lower molecular weight species may be objectionable in some environments, either due to the odor, or to corrosion or discoloration of metal where the mercaptan modified polymer is in contact with a metal in the further presence of moisture.

It would be desirable to be able to produce polymeric products that exhibit satisfactory physical properties, but employing molecular weight modifiers that either would be free of objectionable residual odor, or would have minimal odor of other than a sulfur derived type, and for many applications modified rubbers not containing sulfur would be highly desired.

OBJECTS OF THE INVENTION

It is an object of the invention to provide new classes of modifiers for suspension polymerization systems.

Other objects, advantages and features of our invention will be apparent to those skilled in the art from the following discussion.

BRIEF SUMMARY OF THE INVENTION

Iodine, in the form of the element or as organic iodide, is effective as a molecular weight modifier or regulator in suspension polymerization systems.

DETAILED DESCRIPTION OF THE INVENTION

The invention lies in the employment of iodine, either as elemental iodine or as organic iodide, as a molecular weight regulator or modifier, particularly in suspension polymerization systems. These modifiers are effective and convenient to use.

The invention encompasses the use of our modifiers in conjunction with other modifiers, including a mixed mercaptan modifier-iodine modifier system. Of course, where mutual interaction might occur between the iodine modifier and some other modifier, which would preclude effectiveness, such would not be suitable.

IODINE MODIFIERS

In referring to "iodine modifiers" or "iodine compound" in our disclosure, we include both elemental iodine and the organic iodides for convenience in discussion without needless repetition. Any of the organic iodides possessing the requisite reactivity can be used in the context of our invention. So long as the iodine modifier exhibits adequate solubility in the monomers and solvent used in the suspension polymerization system, and so long as the organic structure did not become so great as to, in effect, overshadow the presence of iodine in the molecule and reduce effectiveness as modifier, then the organic iodine modifier should be satisfactory, and the particular number of carbon atoms per molecule is not a specific operable limit.

The organic iodide modifiers presently suggested for most purposes as modifiers contain up to 20 carbon atoms per molecule, and from one to several iodine atoms per molecule. More than one iodine atom can be present on an individual carbon atom within a molecule. The organic portion of the structure can be saturated or unsaturated aliphatic, or cycloaliphatic or aromatic, such as alkyl, alkenyl, cycloalkyl, cycloalkenyl, or aryl, or any combination thereof, such as alkaryl, aralkyl, and the like. The organic iodine compounds encompass a wide range of molecular structures and variations in reactivity of the individual carbon-iodine bonds, which permit the practitioner of our invention to select modifiers of the desired degree of solubility and activity, governed by the requirements of the individual polymerization system for which a modifier is desired.

The following species are provided for illustration, and not intended to be necessarily limiting or all encompassing: iodine itself, methyl iodide, carbon tetraiodide, ethyl iodide, diiodomethane, hexaiodoethane, 1,1-diiodopropane, 2-iodooctane, 2,7-diiodo-10-methylpentadecane, 1-iodoeicosane, iodocyclohexane, iodobenzene, 1,4-diiodobenzene, benzyl iodide, 4-methyliodobenzene, allyl iodide, and iodine-substituted naphthalene, anthracene, and the like. Of course, non-interfering substituents, e.g., remotely located methyl groups, are permissable in any of the modifiers.

The iodine modifiers should be added to the suspension polymerization system in amounts sufficient for the effect desired and the degree of modification necessary depending on the monomers, polymerization temperatures, and other conditions. A typically employed range for iodine, free or chemically combined, for most suspension systems would be an amount equal to about 0.01 to 2, preferably about 0.4 to 1.5, weight per cent based on the weight of monomers charged. These values are exclusive of any rubbery or resinous component, if used, in the suspension polymerization process.

MONOMERS

Any monomer or monomer combination polymerizable in a suspension polymerization system can be utilized in the practice of our invention. Our invention lies in the novel modifiers and process of employing the novel modifiers, not in the particular suspension process or monomers, since these are well known in the art. In general, any suspension polymerization system for polymerization of monomers polymerizable in a suspension polymerization system and wherein molecular weight modifiers are employed, particularly such as the mercaptan molecular weight modifiers, can enjoy the application of our invention.

Polymers prepared by suspension polymerization systems range from various resinous types such as polystyrene, poly(methyl methacrylate), styrene/acrylonitrile copolymers, to elastomeric or rubbery types such as butadiene/styrene copolymers, or mixed polymers of the butadiene/acrylonitrile type, and the like. Monomeric starting materials may be employed, or suspensions can be made of rubbery polymers such as polybutadiene or butadiene/styrene copolymers, dissolved in monomers such as styrene or styrene and acrylonitrile, and the rubber-in-monomer solution placed in a suspension system for further co- and graft polymerization of the polymerizable monomer onto the polymer.

Monomers employed as monomeric materials in suspension polymerization systems include polymerizable monovinyl-substituted aromatic compounds and other polymerizable monomers such as the nitriles, esters of acrylic acids, or of alkacrylic acids, and vinyl esters. Such suspension system-polymerizable monomers most commonly include the monovinyl-substituted aromatic compounds of 8 to 20 carbon atoms per molecule, vinyl nitriles of 8 to 20 carbon atoms per molecule, alpha, beta-unsaturated nitriles, esters of acrylic acid, and vinyl esters, of up to 20 carbon atoms per molecule, and the like.

While polymerizable monomers such as the conjugated dienes are not employed as monomers in our suspension polymerization sytem, these monomers commonly are employed in polymerization systems, such as solution polymerization with organoalkali metal initiators, to prepare polymers of the conjugated dienes such as polybutadiene, butadiene/styrene copolymers, mixed polymers such as butadiene/acrylonitrile type, and the like, and these polymers then are dissolved in other polymerizable monomers such as described above for graft and copolymerization in the suspension polymerization system. Such conjugated dienes include any of the polymerizable conjugated dienes, for commercial availability from 4 to 12 carbon atoms per molecule in most instances, such as 1,3-butadiene, isoprene, piperylene, 2,4-dimethyl-1,3-butadiene, 1,3-octadiene, 4,5-diethyl-1,3-octadiene, and the like.

Examples of monomers described above include styrene, various alkyl substituted styrenes such as ethylstyrene, acrylonitrile, methacrylonitrile, methyl acrylate, vinyl acetate, vinyl butyrate, 4-vinylbiphenyl, 2-vinylnaphthalene, and various combination systems or mixtures thereof such as butadiene/styrene, styrene/acrylonitrile, butadiene/styrene/acrylonitrile, and the like.

INITIATOR

Although the suspension polymerization reaction may proceed thermally, it is preferable to incorporate into the polymerization system a free-radical generating initiator. Initiators useful in the context of this invention include the monomer-soluble organic peroxides, such as di-t-butyl peroxide, benzoyl peroxide, lauroyl peroxide, toluyl peroxide, t-butyl peracetate, t-butyl perbenzoate, dicumyl peroxide, 2,5-dimethyl-2,5-di(t-butylperoxy)hexane, 2,5-dimethyl-2,5-di(t-butylperoxy)hexyne-3, t-butyl hydroperoxide, cumene hydroperoxide, p-menthane hydroperoxide, cyclopentane hydroperoxide, diisopropylbenzene hydroperoxide, pinene hydroperoxide, 2,5-dimethylhexane-2,5-dihydroperoxide, and the like, and mixtures thereof; as well as any of the monomer-soluble azo initiators useful in suspension polymerization systems such as 2,2′-azobis(2-methylpropionitrile), 2,2′-azobis(2-methylvaleronitrile), and the like, and mixtures. The quantity of initiator employed usually ranges from about 0.005 to 1 weight percent of the total weight of monomers charged, though this may be varied as desired dependent on the reactants, temperatures, and the like.

SUSPENSION POLYMERIZATION

Suspension polymerization refers to a system in which monomers relatively insoluble in water are suspended as liquid droplets using a suspending agent so as to maintain the suspension, and the resultant polymer is obtained as a dispersed solid phase, i.e., pearl or bead polymerization. While the monomers may be directly dispersed in a suspension polymerization system, hydrocarbon solvents or diluents are commonly employed with the monomers, such as n-heptane, isooctane, cyclohexane, benzene, toluene, and the like, including mixtures.

In the suspension polymerization system, a monomer mixture is made up of monomer, or monomers, or, where desired, a polymer-in-monomer solution, solvent where desired, modifier, and, where employed, a free radical initiator. This mixture then is suspended in a water solution containing various suspending agents. The amount of water employed can vary widely, depending on the type of reactor employed, agitation means, and the like, though the final suspension mixture expediently will contain on the order of about 20 to 60 per cent by weight of the monomer-elastomer based on total weight of the entire mixture including water.

A variety of suspending agents can be employed in suspension polymerization systems, since the method involves a liquid-in-liquid dispersion and affords a final product in the form of discrete solid particles termed beads or pearls. The suspension stabilizers include insoluble carbonates, silicates, talc, gelatin, pectin, starch, insoluble phosphates, and the like.

The time employed for polymerization should be that sufficient for the degree or extent of conversion desired, and can vary over a wide range, depending on various reaction parameters such as the temperature employed, from a very few minutes to many hours, such as 48 hours. Temperatures employed are at least sufficient to effectuate thermal polymerization, or to cause decomposition of the free radical initiator, where used, which provides initiation of the reaction, preferably below temperatures which might cause gel formation of the polymer. Temperatures presently preferably employed are in the range of about 50°C. to 150°C.

EXAMPLES

The examples following are intended to further illustrate our invention, and not to limit the reasonable scope of invention. Particular species employed for purposes of illustration, reaction parameters, amounts or ratios employed, all are intended to assist those skilled in the art in practicing our invention, without limiting the reasonable and proper scope of our invention to which we are entitled by rights of discovery.

EXAMPLE I

A series of runs was conducted in accordance with the following recipes wherein styrene and acrylonitrile were polymerized under suspension polymerization conditions employing various modifiers.

| Monomer Solution Recipe (A) | phm[(a)] |
|---|---|
| Styrene | 70 |
| Acrylonitrile | 30 |
| Modifier | variable |
| t-Butyl peroctoate | 0.3 |
| Suspending Agent Recipe (B) | phm[(a)] |
| $Na_3PO_4 \cdot 12 H_2O$ | 2.45 |
| $H_2O$ | 250 |
| $CaCl_2 \cdot 2 H_2O$ | 1.75 |
| $H_2O$ | 50 |

| | |
|---|---|
| Casein derivative[b] | 0.01 |

[a]Parts per hundred parts monomer
[b]Cascoloid ST56 from Borden Chemical Co.

Separate solutions of sodium phosphate and calcium chloride were made in hot water and the hot solutions combined and stirred. Before cooling, supplementary case in derivative suspending agent was added.

The polymerizations were carried out by combining 50 g of monomer solution (A) and 150 g of suspending agent (B) under nitrogen in 26 oz. beverage bottles with tumbling thereof at about 80°C. for 16 hours. The polymers were recovered by acidifying the product mixtures, collecting the polymer beads on a filter, followed by washing and drying. The results are summarized in Table I.

TABLE I

| Run No. | Modifier Compound | Amt., g. | Conversion Wt. % | Melt Flow No.[a] |
|---|---|---|---|---|
| 1 | iodoform | 1.0 | 91.2 | 48.4 |
| 2 | iodoform | 2.0 | 91.0 | —[c] |
| 3 | chloroform | 1.49 | 93.4 | 0 |
| 4 | chloroform | 2.58 | 94.2 | 0 |
| 5 | Sulfole 120[b] | 0.09 | 93.4 | 0.07 |

[a]ASTM D 1238-65T, Condition G
[b]A mercaptan mixture, primarily t-dodecyl mercaptan, commercially available from Phillips Petroleum Company as Sulfole* 120
[c]Immeasurably high
*Trademark As indicated by comparing the melt flow numbers of the several polymers, the organic iodide modifier iodoform clearly is superior in terms of chain transfer efficiency to the other modifiers employed.

EXAMPLE II

A series of runs was conducted in accordance with the following recipes wherein ABS polymers were prepared by suspension polymerization employing various modifiers.

Polymer Solution Recipe (A)

| | Parts by Weight |
|---|---|
| Butadiene/styrene 75/25 block copolymer[a] | 15 |
| Styrene/acrylonitrile 70/30 mixture | 85 |
| Modifier | variable |
| t-Butyl peroctoate | 0.3 |
| Dicumyl peroxide | 0.1 |

[a]A butadiene/styrene (75/25) block copolymer having about 18 percent block polystyrene and a Mooney viscosity ML-4 at 212° F ASTM D 1646-63 of about 47, commercially available as Solprene* 1205 from Phillips Petroleum Company.

The suspending agent recipe (B) was the same as described for Example I above.

For the polymerizations, 26 oz. beverage bottles were individually charged with 100 g. of polymer solution (A) and 300 g. of suspending agent solution (B). These were allowed to tumble at about 80°C. for 15 hours. The polymers were recovered as Runs 1–5 above. The results are shown in Table II.

TABLE II

| Run No. | Modifier Compound | Parts | Conversion % | Melt Flow g/10 min | Izod Impact ft. lbs/in notch[a] | Flexural Modulus psi × 10–3[b] | Tensile psi[c] | Elongation %[c] |
|---|---|---|---|---|---|---|---|---|
| 6 | Sulfole*120 | 0.4 | 87.8 | 0.08 | —[d] | 329 | 5880 | 23 |
| 7 | Sulfole*120 | 0.5 | 87.5 | 0.57 | 8.58 | 314 | 5640 | 23 |
| 8 | Sulfole*120 | 0.6 | 86.7 | 1.85 | 6.69 | 311 | 5340 | 17 |
| 9 | Iodoform | 0.4 | 81.5 | 0.45 | —[d] | 329 | 5770 | 9 |
| 10 | Iodoform | 0.6 | 82.6 | 3.84 | 0.40 | 336 | 5830 | 8 |
| 11 | Iodoform | 0.8 | 84.0 | 8.05 | 0.40 | 336 | 4670 | 4 |

[a]ASTM D 256-56
[b]ASTM D 790-63
[c]ASTM D 412-66
[d]Not determined

The comparative runs illustrate by melt flow values the high effectiveness of organic iodides as modifiers. The physical properties of the iodide modified polymers were good.

EXAMPLE III

In another series of runs directed toward the synthesis of ABS polymers, the modifiers employed included elemental iodine. These runs were made in accordance with the polymerization recipes and procedures described in Example II above. The results are shown in Table III.

TABLE III

| Run No. | Compound | g. | Conversion Wt. % | Melt Flow g/10 min | Izod Impact ft. lbs./in. notch |
|---|---|---|---|---|---|
| 12 | Sulfole* 120 | 0.5 | 89.0 | 0.47 | 8.44 |
| 13 | Diiodomethane | 0.6 | 89.8 | 0.01 | 1.81 |
| 14 | Iodine | 0.6 | 74.3 | 0.44 | 0.76 |

In these runs, the effectiveness of another organic iodide is shown. Iodine also is seen to function as a modifier approximately as effective, on a weight basis, as a $C_{12}$ mercaptan.

Reasonable variations and modifications of our invention are possible yet still within the scope of our disclosure and without departing from the intended scope and spirit thereof.

We claim:

1. In an aqueous suspension graft co-polymerization system wherein at least one polymerizable monomer selected from the group consisting of monovinyl-substituted aromatic compounds, alpha, beta-unsaturated nitriles, esters of acrylic acid, esters of alkacrylic acid, and vinyl esters, is graft polymerized with at least one elastomeric polymer of a conjugated diene under aqueous suspension polymerization conditions in the presence of a molecular weight modifier, the improvement which comprises the step of employing elemental iodine as said molecular weight modifier.

2. The process according to claim 1 wherein is employed 0.01 to 2 weight percent of said elemental iodine relative to the total weight of polymerizable monomer charged to the aqueus suspension polymerization system.

3. The process according to claim 2 wherein said aqueous suspension polymerization system further employs a free radical initiator, said free radical initiator is a peroxide, hydroperoxide, or azo compound, and is employed in a range of about 0.005 to 1 weight percent relative to the total weight of polymerizable monomer charged to the aqueous suspension polymerization system.

4. The process according to claim 3 wherein said at least one polymerizable monomer is selected from the group consisting of styrene, ethyl styrene, acrylonitrile, methacrylonitrile, methyl acrylate, vinyl acetate, vinyl butyrate, 4-vinylbiphenyl, and 2-vinylnaphthalene.

5. The process according to claim 4 wherein said polymerizable monomer is a mixture of polymerizable monomers selected from the group consisting of butadiene with styrene, styrene with acrylonitrile, and butadiene/styrene/acrylonitrile.

6. The process according to claim 5, wherein said aqueous suspension polymerization system employs both styrene and acrylonitrile as said polymerizable monomers, and said free radical initiator is t-butylperoctoate.

7. The process according to claim 3 wherein said aqueous suspension polymerization system further employs a hydrocarbon diluent, and wherein the suspension mixture contains about 20 to 60 weight percent of polymerizable monomer and elastomeric polymer of a conjugated diene based on total weight of the entire mixture.

8. The process according to claim 7 wherein said elastomeric polymer is selected from the group consisting of polybutadiene, butadiene/styrene copolymers, and butadiene/acrylonitrile copolymers.

9. The process according to claim 8 wherein said aqueous suspension polymerization system employs butadiene/styrene copolymer as said elastomeric copolymer, both styrene and acrylonitrile as said polymerizable monomer, and wherein said free radical initiator is t-butylperoctoate or dicumyl peroxide.

10. The process according to claim 2 wherein said elemental iodine is employed in a range of about 0.4 to 1.5 weight percent based on the weight of polymerizable monomer charged to the system.

11. The process according to claim 3 wherein said free radical initiator is di-t-butyl peroxide, benzoyl peroxide, lauroyl peroxide, toluyl peroxide, t-butyl peracetate, t-butyl perbenzoate, dicumyl peroxide, 2,5-dimethyl-2,5-di(t-butylperoxy)hexyne-3, t-butyl hydroperoxide, cumene hydroperoxide, p-menthane hydroperoxide, cyclopentane hydroperoxide, diisopropylbenzene hydroperoxide, pinene hydroperoxide, 2,5-dimethylhexane-2,5-dihydroperoxide, 2,2'-azobis(2-methylpropionitrile), or 2,2'-azobis(2-methylvaleronitrile).

12. A graft polymerization process wherein at least one polymerizable monomer is graft polymerized under aqueous suspension graft polymerization conditions with at least one rubbery copolymer employing a free-radical generating initiator and a molecular weight modifier,
wherein said at least one polymerizable monomer is an admixture of about 70:30 weight ratio mixture of styrene:acrylonitrile,
wherein said rubbery copolymer is a block copolymer of butadiene/styrene in a weight ratio of about 75:25,
wherein said polymerizable monomer and said rubbery copolymer are employed in a weight ratio of about 85:15,
wherein the aqueous suspension polymerization admixture contains about 20 to 60 percent by weight of monomer - elastomer based on total weight of the entire mixture including water,
wherein said free radical generating initiator comprises t-butyl-peroctoate employed in an amount representing about 0.005 to 1 weight percent of the total weight of polymerizable monomer charged,
wherein said aqueous suspension polymerization conditions include polymerization temperatures in the range of about 50° C to 150° C,
and wherein said molecular weight modifier is elemental iodine employed in an amount equal to about 0.01 to 2 weight percent based on the weight of said polymerizable monomer charged to said aqueous suspension polymerization system.

13. A graft polymerization process wherein at least one polymerizable monomer is graft polymerized under aqueous suspension graft polymerization conditions with at least one rubbery copolymer employing a free-radical generating initiator and a molecular weight modifier,
wherein said at least one polymerizable monomer is an admixture of about 70:30 weight ratio mixture of a polymerizable monovinyl-substituted aromatic compound of 8 to 20 carbon atoms per molecule with an alpha, beta-unsaturated nitrile of up to 20 carbon atoms per molecule,
wherein said rubbery copolymer is a copolymer of a conjugated diene of 4 to 12 carbon atoms per molecule with a monovinyl substituted aromatic compound of 8 to 20 carbon atoms per molecule in a weight ratio of about 75:25,
wherein said polymerizable monomer and said rubbery copolymer are employed in a weight ratio of about 85:15,
wherein the final aqueous suspension polymerization admixture contains about 20 to 60 percent by weight of monomer-elastomer based on total weight of the entire mixture including water,
wherein said free radical generating initiator comprises a monomer-soluble organic peroxide, hydroperoxide, or azo compound employed in an amount representing about 0.005 to 1 weight percent of the total weight of polymerizable monomer charged,
wherein said aqueous suspension polymerization conditions include polymerization temperatures in the range of about 50° C to 150° C,
and wherein said molecular weight modifier is elemental iodine employed in an amount equal to about 0.01 to 2 weight percent based on the weight of polymerizable monomer charged to said aqueous suspension polymerization system.

* * * * *